O. FINNEL & F. CARSON.
BRIDLE BIT.
APPLICATION FILED JULY 17, 1909.
956,063.
Patented Apr. 26, 1910.
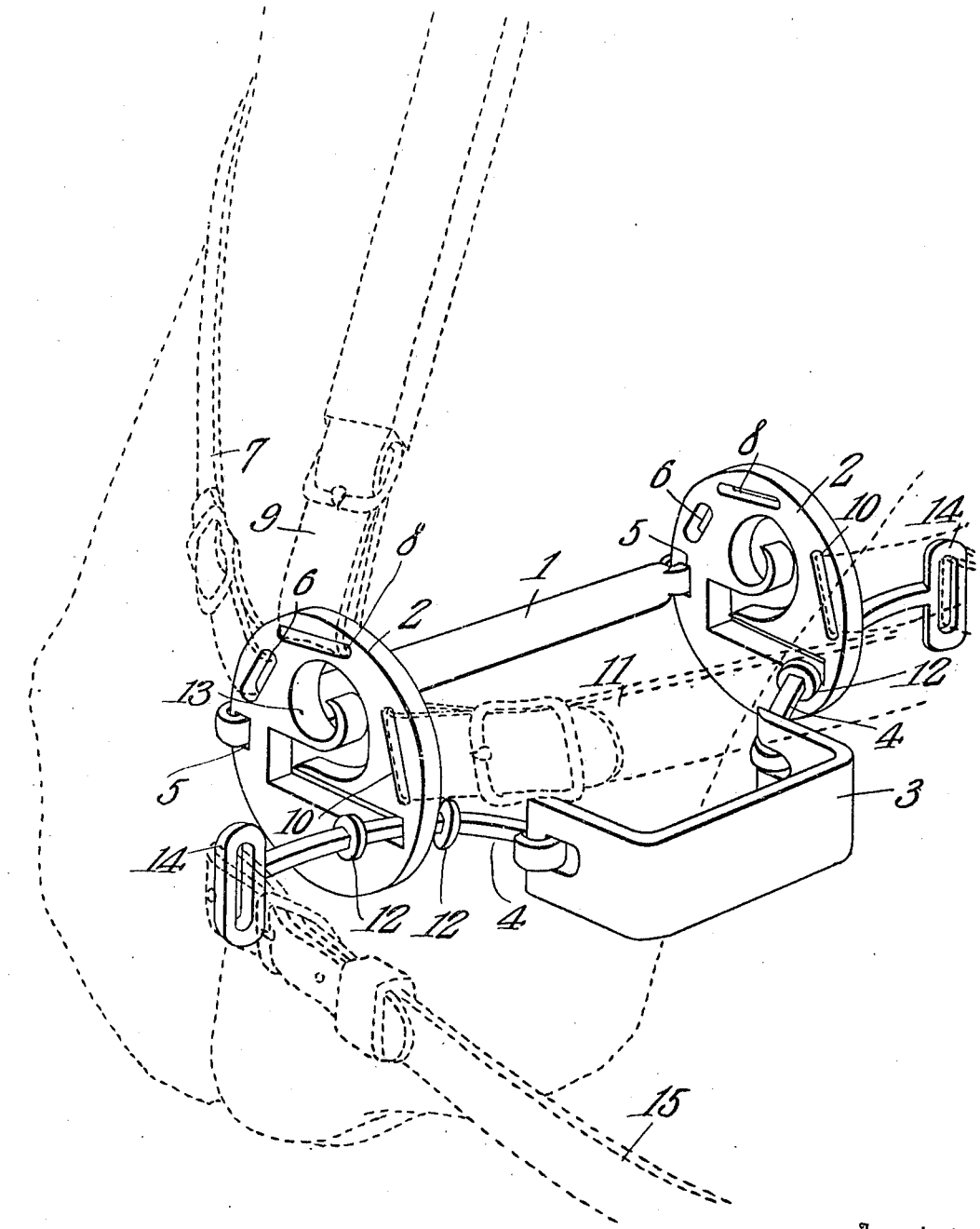
Witnesses:
Inventors
Oscar Finnel and
Frank Carson
By
Attorneys.

UNITED STATES PATENT OFFICE.

OSCAR FINNEL AND FRANK CARSON, OF BOULDER, MONTANA.

BRIDLE-BIT.

956,063.  Specification of Letters Patent.  Patented Apr. 26, 1910.

Application filed July 17, 1909. Serial No. 508,253.

*To all whom it may concern:*

Be it known that we, OSCAR FINNEL and FRANK CARSON, citizens of the United States, residing at Boulder, in the county of Jefferson and State of Montana, have invented a new and useful Bridle-Bit, of which the following is a specification.

The object of the invention is to provide a bit that, while thoroughly effective in controlling an animal that is fractious, or has a very hard mouth will accomplish its object in a humane manner, all of the execution being accomplished on the outside of the mouth, and without danger of laceration.

A further object is to provide a bridle bit having a supplemental controlling means, detachably connected with the bit-proper, thereby to enable the user to employ either form of bit desired.

With the above and other objects in view. as will appear as the nature of the invention is better understood, the same consists, generally stated, in the various novel details of construction of a bridle bit, as will be hereinafter fully described and claimed.

In the accompanying drawings forming a part of this specification, and in which like characters of reference indicate corresponding parts, the figure is a view in perspective of a bridle bit, showing the same positioned upon the head of a horse, the latter being indicated by dotted lines.

The bit comprises a bar 1, a pair of rings 2, a chin clip 3, and a pair of levers 4 that are connected with the bit, and are assembled and arranged for both sliding and rocking movements relative thereto.

The bit is herein shown as straight, although it may be of other form, and has its terminals flattened and passed through orifices 5 in the rings, and bent upon themselves to form loops or links. In addition, the rings are provided with orifices 6 to be engaged by the overdraw check billet 7, with orifices 8 to be engaged by the head stall billet 9, and with orifices 10 to be engaged by the line billets 11.

Each of the rings is preferably provided with an approximately 2-shaped slot to receive the levers 4, which latter carry knobs or stops 12 to limit longitudinal sliding movement of the levers relatively to the rings. The object of these peculiarly shaped slots is to permit of levers being detached from the rings, when the levers are not needed, and to effect this result, the levers are moved longitudinally along the base or longer member of the slots, then upward, into the curved portions thereof, and thence into the eyes 13 of the slots, which are large enough to permit of the knobs being passed therethrough. When this has been accomplished, the levers are moved back to their original position, and then turned at right angles to that shown, in order to permit of the side check-rein engaging loops or heads 14 to be passed through the longer or base member of the slot. In addition, it will be observed that by the peculiar arrangement of the slots, it will be impossible for the levers ever accidentally to work loose and thus become disconnected from the ring.

The levers are preferably rearwardly bowed, and are pivotally connected with the chin clip 3, which is shown as an open sided rectangular structure of a size to straddle the chin and engage the depressor muscle of the animal.

Under ordinary conditions of use, the side check-reins 15 will remain loose, and the guiding of the animal will be secured by means of the line billets 11; but in the event that the horse becomes fractious, or has a very hard mouth, draft upon the side check-reins 15 will swing the outer ends of the levers 4 rearward and their inner ends forward, and thereby project the clip 3, and cause it forcibly to press against the depressor muscle, and thereby check the animal.

As will be obvious, it will be impossible under this arrangement for the animal to get control of the bit, so that no trouble will be had in managing a most unruly animal.

What we claim is:—

1. A bridle bit comprising a bar, rings assembled therewith and provided with approximately 2-shaped slots located entirely within the contour of the rings, levers mounted at one end of the slots and provided with stops adapted to pass through the other end of the slots and to engage the rings at the first named end of the slots, and a chin clip carried by the levers.

2. A bridle bit comprising a bar; rings assembled therewith and provided with slots comprising a straight base portion and a curved portion terminating in an enlargement; levers normally fulcrumed intermediate their ends within the straight portions of the slots, for sliding and for rocking movement and terminally provided with line-engaging heads; stops carried by the levers, and engageable by the rings when said levers are in fulcrumed position; and a chin clip connected with the levers; the stops being removable through the enlargements of the slots only, and the heads being removable through the straight portions of the slots only.

In testimony that we claim the foregoing as our own, we have hereto affixed our signatures in the presence of two witnesses.

OSCAR FINNEL.
FRANK CARSON.

Witnesses:
FRED G. HINKLE,
JAMES A. ANDERSON.